(12) United States Patent
Xiong

(10) Patent No.: US 7,710,099 B2
(45) Date of Patent: May 4, 2010

(54) POWER CONTROL APPARATUS FOR MOTHERBOARD

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 306 days.

(21) Appl. No.: 11/965,750

(22) Filed: Dec. 28, 2007

(65) Prior Publication Data

US 2009/0106565 A1 Apr. 23, 2009

(30) Foreign Application Priority Data

Oct. 22, 2007 (CN) .......................... 2007 1 0202192

(51) Int. Cl.
*H02J 1/00* (2006.01)

(52) U.S. Cl. ..................................... 323/351
(58) Field of Classification Search ................. 323/265, 323/271, 272, 273, 282, 349, 351
See application file for complete search history.

(56) References Cited

U.S. PATENT DOCUMENTS

| 7,353,408 | B2 * | 4/2008 | Yeh ............................. 713/300 |
| 7,378,821 | B2 * | 5/2008 | Simpson, III ............... 323/205 |
| 2008/0203982 | A1 * | 8/2008 | Chen et al. ................... 323/266 |
| 2009/0208192 | A1 * | 8/2009 | Xi et al. ...................... 388/819 |

* cited by examiner

*Primary Examiner*—Adolf Berhane
(74) *Attorney, Agent, or Firm*—Frank R. Niranjan

(57) ABSTRACT

A power control apparatus for automatically turning on or off a motherboard includes a first connector, a second connector, and a control circuit. The control circuit includes a timing chip, a first variable resistor, a second variable resistor, a first capacitor, a first switch element, and a second switch element. When the first capacitor is charged, the output terminal of the timing chip outputs a high level signal, the first switch element and the second switch element are turned on, the control circuit outputs a 5V voltage to the motherboard. When the first capacitor discharges, the output terminal of the timing chip outputs a low level signal, the first switch element and the second switch element are turned off, the control circuit does not output 5V voltage to the motherboard.

8 Claims, 1 Drawing Sheet

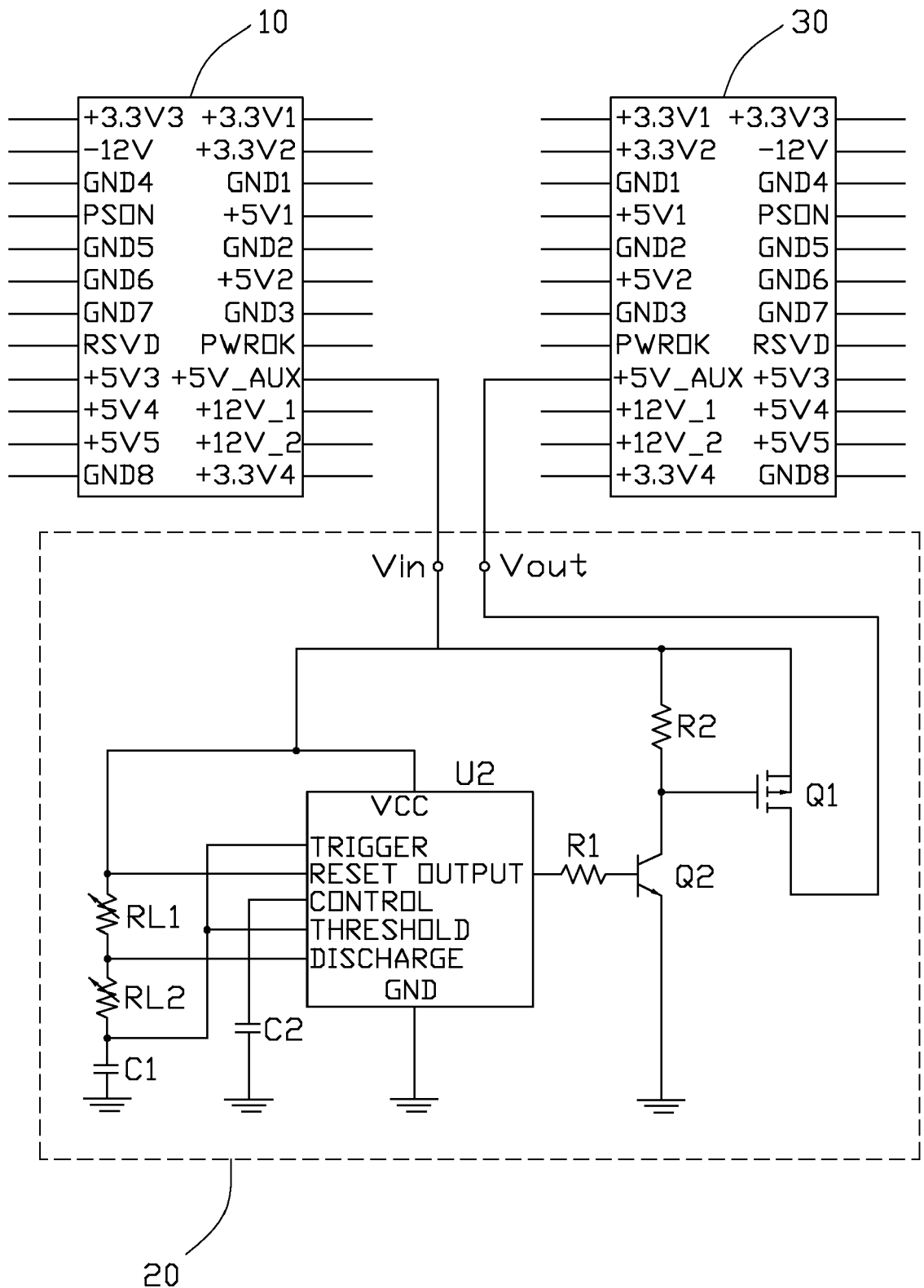

POWER CONTROL APPARATUS FOR MOTHERBOARD

BACKGROUND

1. Field of the Invention

The present invention relates to a control apparatus, and especially relates to a power control apparatus for a computer motherboard.

2. Description of Related Art

In computer systems such as personal computer (PC) systems, operators usually need to press a power bottom of the PC system to ground a sixth terminal of a computer front panel header, thereby turning on the computer system, which is inconvenient and time consuming for operators manually performing a motherboard test, in which it is common to power up the motherboard about a thousand times.

What is desired, therefore, is to provide a simple low-cost power control apparatus for a computer motherboard.

SUMMARY

In one embodiment, a power control apparatus for automatically turning on or off a motherboard, comprises a first connector for connecting to a power supply, a second connector for connecting to the motherboard, and a control circuit. The control circuit includes a timing chip, a first variable resistor and a second variable resistor, a first capacitor, a first switch element and a second switch element. A power pin of the first connector connected to a voltage terminal and a reset terminal of the timing chip, and grounded via the first variable resistor, a second variable resistor, and a first capacitor connected in series. A discharge terminal of the timing chip connected to a node between the first variable resistor and the second variable resistor. A trigger terminal and a threshold terminal both connected to a node between the second variable resistor and the first capacitor. The first switch element includes a first terminal connected to a power pin of the first connector, a second terminal grounded, and a control terminal connected to the output terminal of the timing chip. The second switch element includes a first terminal connected to a power pin of the first connector, a second terminal connected to a power pin of the second connector corresponding to the first connector, and a control terminal connected to the first terminal of the first switch element.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a power control apparatus for a motherboard of computer in accordance with an embodiment of the present invention.

DETAILED DESCRIPTION

Referring to the drawing, a power control apparatus in accordance with an embodiment of the present invention is provided for controlling on/off of a computer motherboard (not shown). The power control apparatus includes two connectors 10 and 30, a control circuit 20. The control circuit 20 includes a voltage input terminal Vin, a voltage output terminal Vout, a timing chip U2, two switch elements Q1 and Q2, two capacitors C1 and C2, two resistors R1 and R2, and two variable resistors RL1 and RL2. Each of the switch elements can be a bipolar junction transistor (BJT), a field effect transistor (FET), or an insulated gate bipolar transistor (IGBT). In this embodiment, the switch element Q1 is a P-channel FET, and the switch element Q2 is an NPN transistor.

A 5V standby power pin 5V_AUX of the connector 10 is connected to the voltage input terminal Vin of the control circuit 20. The voltage input terminal Vin is connected to the source of the FET Q1, and a voltage terminal Vcc and a reset terminal RESET of the timing chip U2. The voltage input terminal Vin is connected to the collector of the transistor Q2 via the resistor R2, and grounded via the variable resistors RL1, RL2 and the capacitor C1 connected in series. A discharge terminal DISCHARGE of the timing chip U2 is connected to a node between the variable resistor RL1 and the variable resistor RL2. A trigger terminal TRIGGER and a threshold terminal THRESHOLD of the timing chip U2 are connected to a node between the variable resistor RL2 and the capacitor C1. A control terminal CONTROL of the timing chip U2 is grounded via the capacitor C2. A ground terminal GND of the timing chip U2 is grounded. An output terminal OUTPUT of the timing chip U2 is connected to the base of the transistor Q2 via the resistor R1. The emitter of the transistor Q2 is grounded, and the collector of the transistor Q2 is connected to the gate of the FET Q1. The drain of the FET Q1 is connected to a 5V standby power pin 5V_AUX of the connector 30 via the voltage output terminal Vout. Alternatively, the resistors R1, R2, and the capacitor C2 can be deleted to save cost.

The connector 10 is connected to a power connector of a power supply. The connector 30 is connected to a power connector of the motherboard. The connector 10 has a same configuration as the power connector of the motherboard. The connector 30 has a same configuration as the power connector of the power supply. Namely, the power connector of the power supply can be directly connected to the power connector of the motherboard in order to provide a voltage for the motherboard. Pins of the connector 10 are connected to pins of the connector 30 correspondingly except that the 5V standby power pins 5V_AUX are connected to the voltage input terminal Vin and the voltage output terminal Vout of the control circuit 20 respectively. In other embodiments, the 5V standby power pins 5V_AUX can be replaced by other pins such as +5V1 pins of the connectors 10 and 30.

In use, the voltage input terminal Vin receives a working voltage from the 5V standby power pin 5V_AUX of the connector 10. When a voltage of the capacitor C1 is less than two thirds of the voltage of the voltage input terminal Vin, the discharge terminal DISCHARGE of the timing chip U2 is turned off, the output terminal OUTPUT of the timing chip U2 outputs a high level signal, the voltage input terminal Vin charges the capacitor C1 via the variable resistors RL1 and RL2, and the transistor Q2 is turned on, the collector of the transistor Q2 outputs a low level signal, the FET Q1 is turned on, the drain of the FET Q1 outputs a 5V working voltage to the motherboard, and the motherboard is powered on.

When the voltage of the capacitor C1 equals two thirds of the voltage of the voltage input terminal Vin, the discharge terminal DISCHARGE of the timing chip U2 is turned on, the output terminal OUTPUT of the timing chip U2 outputs a low level signal, the capacitor C1 discharges via the variable resistor RL2, and the transistor Q2 is turned off, the collector of the transistor Q2 outputs a high level signal, the FET Q1 is turned off, thus the drain of the FET Q1 does not output a working voltage to the motherboard, and the motherboard is powered off. When the capacitor C1 discharges via the variable resistor R2 until the voltage of the capacitor C1 drops to one third of the voltage of the voltage input terminal Vin, the output terminal OUTPUT of the timing chip U2 outputs a high level signal, the capacitor C1 is charged again until the voltage rises to the two thirds of the voltage of the voltage input terminal Vin, and so the cycle continues. Therefore, the motherboard is repeatedly powered on and off for as many times as desired.

Because there are different types of motherboards for computers, the time of power on or power off from one motherboard to the next may be different. Charge and discharge times of the capacitor C1 can be set according to resistance values set for the variable resistors RL1, RL2.

The power control apparatus for a motherboard automatically controls the motherboard to power on and off, thereby improving testing efficiency.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power control apparatus for automatically turning on or off a motherboard, comprising:
    a first connector for connecting to a power supply;
    a second connector for connecting to the motherboard; and
    a control circuit comprising:
        a timing chip, a power pin of the first connector connected to a voltage terminal and a reset terminal of the timing chip, and grounded via a first variable resistor, a second variable resistor and a first capacitor connected in series, a discharge terminal of the timing chip connected to a node between the first variable resistor and the second variable resistor, a trigger terminal and a threshold terminal both connected to a node between the second variable resistor and the first capacitor;
        a first switch element comprising a first terminal connected to a power pin of the first connector, a second terminal grounded, and a control terminal connected to an output terminal of the timing chip; and
        a second switch element comprising a first terminal connected to a power pin of the first connector, a second terminal connected to a power pin of the second connector corresponding to the first connector, a control terminal connected to the first terminal of the first switch element.

2. The power control apparatus as claimed in claim 1, wherein the first switch element is an NPN transistor, the first terminal, the second terminal, and the control terminal are the collector, the emitter, and the base of the NPN transistor respectively.

3. The power control apparatus as claimed in claim 2, wherein the output terminal of the timing chip is connected to the control terminal of the first switch via a first resistor.

4. The power control apparatus as claimed in claim 2, wherein the power pin of the first connector is connected to the first terminal of the first switch element via a second resistor.

5. The power control apparatus as claimed in claim 1, wherein the second switch element is a P-channel field effect transistor, the first terminal, the second terminal, and the control terminal are the source, the drain, and the gate of the P-channel field effect transistor respectively.

6. The power control apparatus as claimed in claim 1, wherein a control terminal of the timing chip is grounded via a second capacitor.

7. The power control apparatus as claimed in claim 1, wherein the timing chip is a 555 timer.

8. The power control apparatus as claimed in claim 1, wherein the power pins of the first connector and the second connector are 5V standby power pins.

* * * * *